United States Patent
Buchholz

(10) Patent No.: US 6,909,561 B2
(45) Date of Patent: Jun. 21, 2005

(54) ADJUSTABLE GAIN DETECTORS IN RAS DEVICES

(76) Inventor: Claus Werner Buchholz, 1763 Pine Creek Cir., Haslett, MI (US) 48840

( * ) Notice: Subject to any disclaimer, the term of this patent is extended or adjusted under 35 U.S.C. 154(b) by 301 days.

(21) Appl. No.: 10/315,844

(22) Filed: Dec. 10, 2002

(65) Prior Publication Data

US 2004/0246549 A1 Dec. 9, 2004

Related U.S. Application Data

(60) Provisional application No. 60/339,088, filed on Dec. 10, 2001.

(51) Int. Cl.[7] .............................................. G02B 26/08
(52) U.S. Cl. ....................... 359/896; 359/196; 359/385; 359/900; 356/237.3
(58) Field of Search ................................ 359/196–226, 359/385, 389, 391, 394, 896, 900; 356/237.2–237.5, 244; 348/79, 195, 203

(56) References Cited

U.S. PATENT DOCUMENTS 6,707,557 B2 * 3/2004 Young et al. ............... 356/444
6,833,913 B1 * 12/2004 Wolf et al. ............... 356/237.2

FOREIGN PATENT DOCUMENTS

| EP | 0 605 402 A1 B1 | 7/1994 |
| EP | 0 860 989 A2 B1 | 8/1998 |
| JP | 06284286 A B1 | 10/1994 |
| JP | 11225274 B1 | 8/1999 |
| JP | 11252327 B1 | 9/1999 |

OTHER PUBLICATIONS

International Search Report, 4 pages.

* cited by examiner

Primary Examiner—James Phan
(74) Attorney, Agent, or Firm—Rader, Fishman & Grauer, PLLC; James F. Kamp, Esq.

(57) ABSTRACT

Fast, under-sampled raster scans are created and measured in order to automatically determine appropriate settings for the adjustable gain detector that is employed in the device. The non-linear nature of the detector response to gain settings, and the characteristics of the raster scan are modeled to create an overall transfer function that is used to calculate the correct settings of the detector for a full-resolution image. Multiple samples are introduced to the scanning device under computer control, and the auto-exposure device is employed for each sample without user intervention.

18 Claims, 2 Drawing Sheets

ADJUSTABLE GAIN DETECTORS IN RAS DEVICES

CROSS-REFERENCE TO RELATED APPLICATION

This application claims priority based on U.S. provisional patent application No. 60/339,088 filed Dec. 10, 2001.

FIELD OF THE INVENTION

The present invention generally relates to adjustable gain detectors in RAS devices, and more particularly, the present invention relates to adjustable gain detectors in RAS devices that determine a desired gain setting for image acquisition.

BACKGROUND OF THE INVENTION

Currently, laser-scanning, photomultiplier tube (PMT) based imagers are most commonly used for quantification of genome and proteome data from gene and protein micro arrays. Currently, the user of one of these scanners must set the gain of the detector differently for each slide, in order to optimally scan the slide. This is especially the case if the slide preparation is different for each slide, or if the gene profile on the microarray slide is very different from one experiment to the next. The variance in gain setting prevents users from auto-loading multiple slides, and automatically scanning and analyzing multiple slides at once.

U.S. patent application Ser. No. 09/596,391, entitled "An Automated, CCD-Based Microarray Imaging System", assigned to Genomic Solutions Inc, hereby incorporated by reference, describes an auto-exposure method for auto loading multiple slides. Here, a linear detector such as a CCD camera and a stage automatically introduces multiple samples. Sample introduction, calculation of exposure times through an autoexpose technique, collection, and storage of the data are all accomplished under computer control. A user can load the instrument up with multiple samples, pick an appropriate protocol, and walk away from the instrument as it processes many samples.

U.S. patent application Ser. No. 09/566,048 (PCT/US00/12220) entitled "Laser Based Optical Scanning System" and U.S. Provisional App. No. 60/258,440 "Dark-Field Laser Scanner", hereby incorporated by reference, describes laser scanning instrumentation specifically designed for auto-mated sample introduction. Here, the laser illuminates one point on the sample at a time, and one or more photomultiplier tubes (PMT) measure the fluorescence at that point. An image arises when the point is scanned in a raster pattern over the sample and the measurements are arranged in a two-dimensional array. A quantifiable image requires that the gain of the PMT be constant over the course of the scan. To vary the overall brightness of the image, the PMT gain can be adjusted between scans. With the scanner and PMT gain under computer control, automatic optimization of image brightness is possible.

Because micro-array and other samples can vary greatly in their emitted signal brightness, depending on how they are prepared, the detector gain setting often must be set differently, even for similar samples. Setting of this gain often requires user intervention for each sample. Ideally, the instrument would be able to automatically determine the correct gain setting. However, this is a complex task when the detector output is not linearly related to the gain setting. In a PMT for instance, the response to light is linearly related to the number of photons impinging on the tube, at a specified gain setting. However, the relationship between the gain setting and the output of the PMT is very non-linear.

SUMMARY OF THE INVENTION

The present invention automatically calculates the settings for an adjustable gain detector, allowing the user to load up and scan as many different types of samples as the scanner's automated sample introduction method will allow.

In the present invention, fast under-sampled raster scans are created and measured in order to automatically determine appropriate settings for the adjustable gain detector that is employed in the device. The non-linear nature of the detector response to gain settings, and the characteristics of the raster scan are modeled to create an overall transfer function that is used to calculate the correct settings of the detector for a full-resolution image. Multiple samples are introduced to the scanning device under computer control, and the auto-exposure device is employed for each sample without user intervention. The invention allows walk-away imaging of a large number of microarray samples with no user intervention.

BRIEF DESCRIPTION OF THE DRAWINGS

The present invention will now be described, by way of example, with reference to the accompanying drawings, in which.

DETAILED DESCRIPTION

The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes that come within the meaning and range of equivalency of the claims are to be embraced within their scope.

Figure 1:
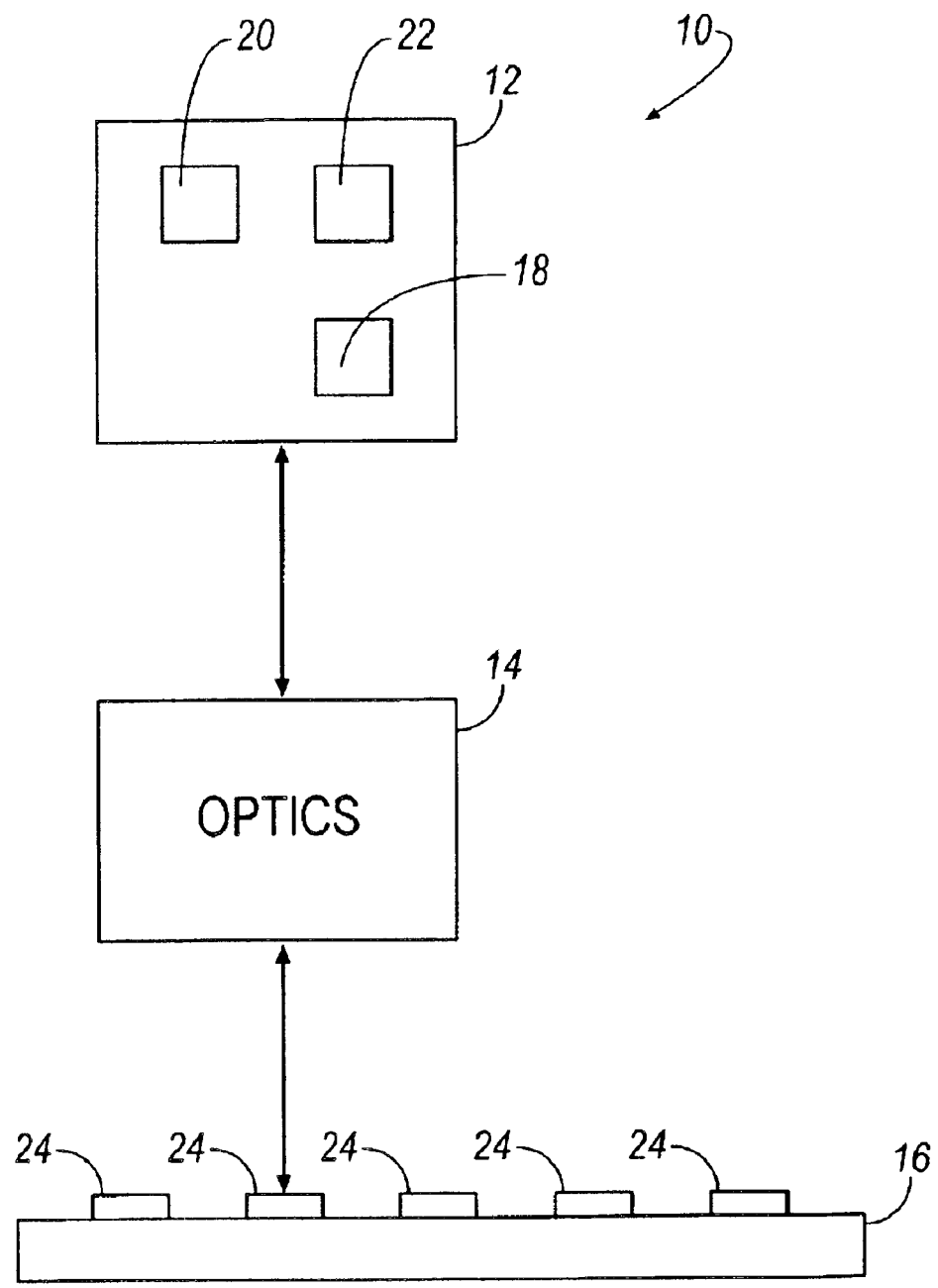
FIG. 1 is a schematic view of an adjustable gain detector according to an aspect of the invention.

Referring now to FIG. 1, the present invention is schematically shown and described. In FIG. 1, a scanner 10 generally includes transmission and reception equipment 12, optics 14 and substrate carriage 16. Transmission and reception equipment 12 generally includes illumination source 18, receiver 20 and processor 22. Illumination source 18 can be one or more lasers or other known illumination devices for transmitting light onto or through a sample contained on a substrate. Receiver 20 can be any type of receiver including a CCD (charge couple device), but is preferably a photomultiplier tube PMT. Processor 22 intercommunicates with the receiver 20 to adjust the gain of the receiver 20 as will be described in greater detail.

Substrate carriage 16 includes a plurality of substrates 24 for holding samples such as protein, RNA, DNA etc. Preferably, the substrate carriage is automated and interacts with processor 22 to allow indexing of new substrates 24 into an imaging position after a previous substrate 24 is processed.

Optics 14 includes the lenses, prisms, motors and other focal and reflector equipment for effectuating a scan and transmitting light from the illumination source 18, to or through a target substrate 24 and back to receiver 20.

Figure 2:
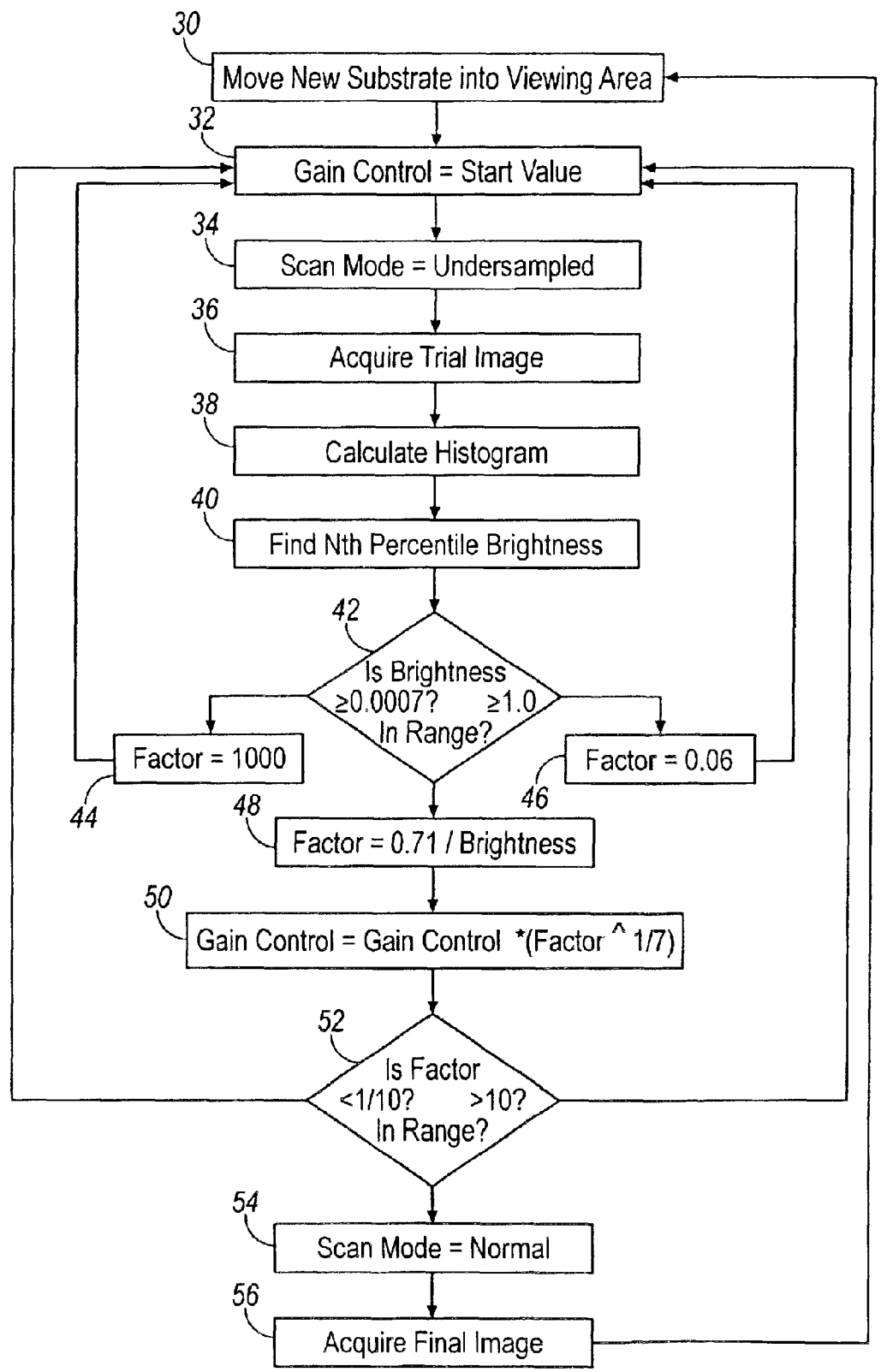
FIG. 2 is a flowchart depicting an operation according to an embodiment of the invention.

Referring now to FIG. 2, the operation of the present invention is described. In FIG. 2, an auto-exposure algorithm is shown which uses an initial gain setting, supplied by a user, to acquire a trial image. Preferably for speed, the trial images are obtained by undersampling. By way of a non-limiting example, only every fourth pixel of every fourth line is collected during undersampling. This reduces scan time by a factor of between 4 and 16, depending on the scan mechanism. Of course, other types and configurations for undersampling may be effectuated, and the present invention is not limited to that disclosed herein.

In step 30 of FIG. 2, a substrate 24 is indexed into imaging position in scanner 10. In step 32, a starting gain value is set for receiver 20. This value can be any value, and preferably is either an estimated default value or the last used value by the receiver 20. In step 34, the substrate 24 is sampled at an under-sample rate, such as every 4th pixel of every 4th line. Preferably, steps 34–40 happen simultaneously, such that while the trial image is being acquired in step 36, a histogram of the image is determined in step 38, the percentile brightness is determined in step 40 and whether the brightness is in a specific range is determined in step 42.

In a preferred embodiment of the present invention, a laser is used as an illumination source. In a laser scanner, scan time increases with higher image resolution, and is unrelated to brightness. Instead, brightness is determined by the gain of the detector. To quicken trial images, and to avoid bleaching fluorophores or other sample material, the laser scanner preferably under-samples. It preferably collects a coarser image than would be optimal to obtain the best possible resolution. When undersampling a raster scan, the scanner is programmed to collect fewer samples per line, and/or to increase the space between lines that are scanned. This increases the spacing between sample points in one or both orthogonal x and y directions. The speed that the laser is swept across the sample may also be increased, and the sample time itself may be shortened. The effects of undersampling are preferably correctly modeled to achieve an effective auto-exposure.

In steps 38-42, a histogram method is used to measure the overall brightness of the image, and to calculate the brightness increase or decrease that is required to use the full dynamic range of the instrument. Software of processor 22 computes a histogram of pixel brightness values from the trial image. Since the trial image has 16 times fewer pixels than a final image, the computation is quick. The histogram is searched for the brightness value at a user-specified percentile. This percentile can be manipulated to optimize the system for a particular sample type. However, this manipulation is not required as the default values are chosen to work sufficiently for all samples.

In step 42, whether the brightness is in the desired range is determined. If the brightness is below a predetermined level, such as 0.0007 for example, then the gain is automatically multiplied by 1000, for example. The flowchart then repeats steps 34 on, and a new under-sample scan is acquired with the gain set at this new value. Likewise, if the brightness is determined to be over a predetermined value, such as 1 for example, the gain is multiplied by a factor of 0.06, for example, and a new image is acquired by undersampling by repeating steps 34 on. It should be noted that the above listed numbers are merely examples, and that any particular desired value may be used instead.

In the present embodiment, step 42 accounts for the extreme case when the measured brightness is at full scale (saturated) or drastically undersaturated. When saturated, the brightness is higher than the maximum detectible brightness for the scanner 10. As the algorithm cannot predict the scale factor, processor 20 resets the gain to $\frac{1}{16}$ its initial value, and repeats the under-sample scan. At the other extreme, the measured brightness is much too low for a good prediction, so the algorithm scales the gain by 1000 and repeats the trial. In this particular case, these limits have been chosen empirically to assist in quick convergence of the algorithm toward the proper brightness with a minimum number of oscillations. For some adjustable gain detectors, it may be possible to theoretically model these limits.

In the preferred embodiment, processor 22 ceases the under-sample scan upon determining that the brightness is at or above saturation. Once ceased, steps 34 on are again executed to take a new trial image at the $\frac{1}{16}$, for example, new gain setting. By this way, the system does not need to complete the entire trial image before beginning a new trial image, thereby saving time. As the illumination has already been determined to be above saturation, there is not need to complete the remainder of the initial trial image.

In step 48, by way of non limiting example, the desired brightness is 0.71 of the saturated brightness (as will be described in greater detail). This factor moves the desired brightness from a level of almost saturated, to a desirable level of approximately ¾ of saturated brightness. In step 48, a scale factor is calculated, which is the ratio between the desired brightness at that percentile and the measured brightness at that percentile. As stated above, the desired brightness is taken to be 0.71 percent of full brightness, which is one half bit short of the full dynamic range of the scanner of the preferred embodiment (nominally 16 bits). However, it is understood that 0.71 is one example, and that any other value can be selected. The scale factor is the factor by which the gain must change for the next trial exposure or undersample scan. If that factor falls close enough to unity, the algorithm will settle on that prediction, stop acquiring trial images, and acquire the final image at the scaled gain. Otherwise, it will acquire another trial image at the scaled gain and repeat the histogram analysis.

In step 50, the detector parameters must be manipulated to achieve the brightness change determined in step 48. In this embodiment, the scale factor predictions must be adjusted for the non-linear behavior of the receiver gain control. Processor 22 is programmed to change the receiver supply voltage. According to the present embodiment including the PMT as the receiver 22, the gain changes relative to the seventh power of supply voltage. To change the PMT gain by the desired scale factor, the autoexposure algorithm multiplies the PMT supply voltage by the seventh root of that factor before acquiring the next image in step 50. A similar approach may be taken to model the behavior of other adjustable gain detectors.

In step 52, it is determined whether another under-sample scan or trial image needs to be acquired. Here It is determined whether another under-sample scan needs to be taken with the corrected value or whether the current determined gain adjustment is sufficient. In this embodiment, scale factors within the range of $\frac{1}{10}$ to 10 are deemed close enough for an accurate prediction of the gain for the final image. However, it will be understood that other values may also be used. If the scale factor is not within this range, the process repeats with step 34 and another under-sample scan is taken.

If the determined scale factor is within the range set out in step 52, then the final scale factor is predicted in step 54. Also in step 54, the scan mode is set to the normal mode which acquires the scan at the slower full speed. The scan parameters are reset under software control of processor 22 to acquire the final image. If the data acquisition time for a data point is changed, this change must also be modeled, and the supply voltage to receiver 20 must be adjusted to reflect the change. In this embodiment, the sample time (5 or 10 microseconds depending on the data acquisition card) is kept constant for both trial images and full-resolution final images, so an additional gain adjustment is not required for the receiver 22.

Once the final image is acquired in step 56, the next biochip substrate 24 is automatically indexed into the viewing field of the scanner by substrate carriage 16, and the auto-exposure process is repeated. Should extended dynamic range data be required, one or more alternative gain settings could be calculated from the gain transfer function, and additional images could be acquired automatically at the alternative gain settings before moving on to the next slide.

While the present invention has been particularly shown and described with reference to the foregoing preferred and alternative embodiments, it should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A scanner comprising:

an illumination source;

at least one substrate containing a sample that is selectively illuminated by the illumination source;

a receiver that receives light from the sample;

optics that direct light from the illumination source to the substrate and back from the substrate to the receiver;

a processor that adjusts a gain level of the receiver and controls the optics and the illumination source to effectuate a scan of the sample on the substrate;

wherein the processor is adapted to initiate the optics, illumination source, and receiver to effectuate an under-sample scan at an initial gain level and determine an illumination level read by the receiver;

wherein the processor is adapted to adjust the gain level of the receiver based on the determined illumination level; and wherein the processor is adapted to initiate the optics, illumination source, and receiver to effectuate a final scan at the adjusted gain level if the adjusted gain level is within a predetermined range.

2. The scanner according to claim 1, wherein the processor is adapted to initiate the optics, illumination source, and receiver to effectuate a second under-sample scan if the adjusted gain level is outside the predetermined range.

3. The scanner according to claim 1, wherein an upper value of the predetermined range indicates a saturation level of the receiver.

4. The scanner according to claim 3, wherein the processor is adapted to stop the under-sample scan and initiate a second under-sample scan if the determined illumination is above the upper value of the predetermined range.

5. The scanner according to claim 1, wherein the receiver is a photomultiplier tube.

6. The scanner according to claim 1, wherein the illumination source is a laser.

7. The scanner according to claim 1, further comprising:

a substrate carriage with a plurality of substrates;

wherein the processor is adapted to communicate with the substrate carriage to index one of the plurality of substrates into an imaging position after the final scan is effectuated.

8. The scanner according to claim 1, wherein the processor is adapted to:

multiply the determined illumination by a reduction factor to obtain a first factor if the determined illumination is within the predetermined range; and determine a ratio between a desired brightness and the first factor to determine a scaling factor.

9. The scanner according to claim 8, wherein the processor is adapted to multiply the scaling factor by an adjustment factor to arrive at an adjusted scaling factor, wherein the adjustment factor is a value sufficient to compensate for non-linear behavior in the receiver.

10. The scanner according to claim 9, wherein the processor is adapted to multiply the adjusted scaling factor by the initial gain level to arrive at the adjusted gain level.

11. A method for adjusting a gain level in a scanner, the method comprising the steps of:

positioning a substrate containing a sample into an imaging position of the scanner;

conducting an under-sample scan on the sample with a receiver of the scanner set at an initial gain level;

determining an illumination level of the substrate as detected by the receiver;

determining whether the determined illumination level is within a predetermined range; and adjusting the initial gain level of the receiver if the determined illumination is outside the range;

conducting a second under-sample scan at the adjusted gain level if the determined illumination is outside the range.

12. The method according to claim 11, further comprising the steps of:

determining a correction factor to adjust the initial gain level to achieve a desired illumination if the determined illumination is within the predetermined range; and adjusting the initial gain level with the correction factor to arrive at an adjusted gain level if the determined illumination level is within the predetermined range; and obtaining a final image at a normal sample rate with the adjusted gain level.

13. The method according to claim 12, wherein the step of determining the correction factor further comprises:

multiplying the determined illumination by a reduction factor to obtain a first factor if the determined illumination is within the predetermined range;

determining a ratio between a desired brightness and the first factor to obtain a scaling factor; and multiplying the scaling factor by an adjustment factor to arrive at the adjusted scaling factor, wherein the adjustment factor is a value that compensates for non-linear behavior in the receiver.

14. The method according to claim 13, wherein the step of adjusting the initial gain level further comprises multiplying the adjusted scaling factor by the initial gain level to arrive at the adjusted gain level.

15. The method according to claim 11, wherein an upper value of the predetermined range indicates a saturation level of the receiver.

16. The method according to claim 11, further comprising the steps of:

ceasing the under-sample scan if the determined illumination is at or above the upper value;

decreasing the gain level of the receiver; and re-executing a second under-sample scan with the decreased gain level.

17. The method according to claim 11, wherein the receiver is a PMT.

18. The method according to claim 11, wherein the scanner has an illumination source that is a laser.

* * * * *